United States Patent Office 3,535,346
Patented Oct. 20, 1970

3,535,346
CATALYST FOR THE PRODUCTION OF CARBOXYLIC ACID ANHYDRIDE
Kyohei Sudo and Susumu Sato, Hikari, Japan, assignors to Takeda Chemical Industries, Ltd., Osaka, Japan
No Drawing. Filed Sept. 13, 1967, Ser. No. 667,349
Claims priority, application Japan, Sept. 14, 1966, 41/60,978
Int. Cl. B01j *11/82;* C07c *57/14*
U.S. Cl. 260—346.8                                6 Claims

ABSTRACT OF THE DISCLOSURE

The incorporation of specified amounts of silver oxide and sodium oxide into otherwise conventional vanadium oxide-molybdenum oxide catalyst compositions for the oxidative production of dicarboxylic acid anhydrides from organic compounds, such as benzene, xylene and naphthalene, enhances the catalytic activity of such compositions, and makes it possible to obtain high yields while carrying out the oxidation under mild conditions. The life of the catalyst is also considerably lengthened. Further enhancement of the catalytic activity is obtained by additionally incorporating a small amount of $B_2O_3$ thereinto.

---

This invention relates to catalyst compositions for the production of dicarboxylic acid anhydride and, more particularly, to improved vanadium oxide-molybdenum oxide type catalyst compositions which are modified by the incorporation of silver oxide and sodium oxide.

Vanadium oxide-molybdenum oxide compositions have ben used as catalysts in the preparation of dicarboxylic acid anhydride by oxidation of an organic compound, for example benzene, xylene, naphthalene, etc. Since such catalysts have only a short useful life, especially when employed at high temperature, many attempts have been made to overcome this defect. However, the use of such catalysts has heretofore given rather low yields of the desired dicarboxylic acid anhydride, especially when used under mild conditions (e.g. at rather low temperature). Therefore, such catalysts are not very satisfactory for the production of dicarboxylic acid anhydride on a commercial scale.

The present invention is directed to the provision of more highly activated catalysts for the production of dicarboxylic acid anhydride by oxidation of organic compounds, which catalysts are capable of producing the desired compounds in high yield even under rather mild conditions. This objective has now been achieved by incorporating silver oxide ($Ag_2O$) and sodium oxide ($Na_2O$) in specified amounts into the known vanadium oxide-molybdenum oxide type catalysts, whereby catalysts of remarkably enhanced catalytic activity result.

It is thus an object of this invention to provide novel, highly activated and long-life catalysts useful for the production of dicarboxylic acid anhydride, especially maleic anhydride and/or phthalic anhydride, in a high yield by oxidation of organic compounds, e.g. benzene, toluene, o-xylene, naphthalene, etc.

Another object of this invention is to provide a process for the production of dicarboxylic acid anhydride, especially maleic anhydride, in a high yield by oxidation of organic compounds, e.g. benzene, toluene, o-xylene, naphthalene, etc. under rather mild conditions.

Other objects will be apparent to those skilled in the art upon reading the following description.

This invention in one aspect concerns novel and highly activated catalyst compositions for the production of dicarboxylic acid anhydride by oxidation of organic compounds, which compositions consist substantially of 1 mol part of $V_2O_5$, about 0.2 to about 0.7 mol part of $MoO_3$, about 0.01 to about 0.1 mol part of $P_2O_5$, about 0.01 to about 0.05 mol part, more desirably about 0.015 to about 0.03 mol part of $Ag_2O$, and about 0.01 to about 0.3 mol part, more desirably about 0.05 to about 0.2 mol part of $Na_2O$, all these ingredients being supported on a carrier. The activity of the catalyst is further heightened by including about 0.01 to about 0.03, more desirably about 0.01 to about 0.02 mol part of $B_2O_3$ with the above components supported on a carrier.

The catalyst compositions of the present invention can be prepared by homogeneously mixing a carrier with the precursors of each of the active ingredients, followed by subjecting the mixture to a heat treatment, whereby the precursors are converted into the corresponding oxides.

The carrier can e.g. be carborundum (silicon carbide), aluminum oxide, pumice and the like, carborundum being optimal. The amount of the carrier used is about 100 volume parts relative to about 10 to 30 weight parts of the active ingredients.

The precursors are exemplified by e.g.:

$NH_4VO_3$, $H_3VO_4$, $H_4V_2O_7$, $HVO_3$ for $V_2O_5$;
$(NH_4)_6Mo_7O_{24} \cdot 4H_2O$, $H_2MoO_4$, $H_6Mo_7O_{24} \cdot H_2O$ for $MoO_3$;
$H_3PO_4$, $(NH_4)H_2PO_4$, $HPO_3$ for $P_2O_5$;
$AgNO_3$ for $Ag_2O$;
$NaCl$, $NaHCO_3$, $Na_2CO_3$, $(COONa)_2$ for $Na_2O$;
$H_3BO_4$, $HBO_2$ for $B_2O_3$.

Each of these precursors is used in the ratio (chemical equivalent) corresponding to that of the components of the desired catalytic composition. Practically, at first, an aqueous solution containing all the precursors is prepared by admixing these precursors in water sufficient to dissolve them. In this admixing process, oxalic acid can be used as dissolving agent together with water, if necessary. The amount of oxalic acid is selected from a range of about 0.4 mol to about 1.5 mol relative to 1 mol of the precursor for $V_2O_5$. Thus-prepared solution is homogeneously admixed with the carrier. Then, water is removed by evaporation from the mixture, and finally, the thus-treated mixture is activated by heating at about 380° to about 460° C., more desirably at about 400° to about 440° C. under contacting with air for about 3 to about 15 hours, more desirably for about 7 to about 10 hours.

In order to obtain the desired dicarboxylic acid anhydride by using the catalyst of this invention, the organic compound (benzene, toluene, o-xylene, naphthaleno, etc.), is contacted with oxygen or oxygen-containing gas such as air in the presence of the catalyst at an elevated temperature.

Practically, a gaseous mixture of the organic compound and the oxygen or oxygen-containing gas is, underheating, subjected to contact with the catalyst by, for example, passing through a column packed with the catalyst. The amount of the organic compound is about 0.3 to about 1.2 mol percent relative to the oxygen or oxygen-containing gas.

In case of passing the gaseous mixture through a column packed with the catalyst, the mixture is fed therethrough at a space velocity (hr.$^{-1}$) of about 3000 to about 6000:

$$\text{Space Velocity (hr.}^{-1}) = \frac{\text{Volume of gas fed (l./hr.)}}{\text{Volume of catalyst used (l.)}}$$

(Calculated under one atmosphere at 20° C.) Reaction temperature is about 370° C. to about 480° C. calculated as an average value during the period of contacting with the catalyst.

By the use of a catalyst composition of this invention, the desired dicarboxylic acid anhydride can be produced in remarkably high yield in comparison with prior processes. For example, the yield of maleic anhydride from 100 parts by weight of benzene, when using the present catalyst composition is more than 112 parts by weight, Calculated as maleic acid. Moreover, the catalyst can be effectively employed for more than one year without degradation of the catalytic acitivity, because use of the novel catalysts of this invention in the process for the oxidation of organic compounds, makes it possible to lower the reaction temperature in such process by about 50° to about 100° C. in comparison with the temperature required in the prior art, and consequently the volatilization of sensitive components of the catalyst can effectively be prevented during the reaction.

Further, the present method requires relatively small amounts of oxygen or oxygen-containing gas for the oxidation process of the organic compound. Therefore, the use of the present catalyst in the production of dicarboxylic acid anhydride from the corresponding organic compound is advantageous from an industrial standpoint.

In the following examples, part(s) are on a weight basis, unless otherwise stated. Parts by weight bear the same relation to parts by volume as do grams to milliliters.

EXAMPLE 1

534 parts of oxalic acid and 15.8 parts of sodium chloride and then 620 parts of $NH_4VO_3$ and 180 parts of $(NH_4)_6MoO_{27} \cdot 4H_2O$ are dissolved in 2400 parts by volume of distilled water. To the thus-prepared solution, there is added 100 parts by volume of an aqueous solution containing 7.2 parts of $H_3PO_4$ and 5.6 parts of $H_3BO_3$, and then 100 parts by volume of an aqueous solution containing 25.2 parts of $AgNO_3$ is stirred thereinto.

To the solution thus obtained, there is added 2600 parts of Carborundum, the particle size of which is 3.8 to 4.3 millimeters in diameter, after which the water is slowly removed by evaporation, whereby the solutes are supported on the Carborundum particles.

The above-treated Carborundum particles supporting the solutes thereon are heated at 400° C. for 8 hours, under air-blowing, in an activator which is equipped with external electric heaters. Thus 3100 parts of the desired catalyst is obtained, wherein:

|  | Mol part |
|---|---|
| $V_2O_5$ | 1.0 |
| $MoO_3$ | 0.386 |
| $P_2O_5$ | 0.014 |
| $Na_2O$ | 0.050 |
| $Ag_2O$ | 0.028 |
| $B_2O_3$ | 0.017 | are supported on the Carborundum, the total amount of active ingredients amounting to about 22% (w./v.) relative to the carrier. The catalyst is charged into a stainless steel tube reactor which is equipped with a jacket and external electric heaters. The reactor is heated by the heaters, while molten salts are circulated in the jacket to keep the internal temperature of the reactor at the desired magnitude.

A gaseous mixture of benzene and air is fed into the reactor for 30 hours under various conditions; cf. Table 1. The exit gases are led to a water scrubber, wherein the maleic anhydride is converted into maleic acid. The content of the maleic acid in the scrubbings is determined and yield in calculated.

The results are shown in Table 1:

TABLE 1

|  | Condition | | | Result |
|---|---|---|---|---|
| No. | Space velocity (hr.$^{-1}$) | Concentration of benzene in mixed gas (mol percent) | Reaction temperature [1] | Maleic acid yield [2] (wt. percent) |
| 1 | 5,000 | 1.40 | 429 | 112 |
| 2 | 4,000 | 0.95 | 422 | 116 |
| 3 | 3,000 | 0.95 | 417 | 119 |

[1] Average temperature of catalyst.
[2] Relative to the weight of benzene fed.

EXAMPLE 2

26.7 parts of oxalic acid and 0.395 part of sodium chloride and then 31 parts of $NH_4VO_3$ and 9 parts of $(NH_4)_6MoO_{27} \cdot 4H_2O$ are dissolved in 120 parts by volume of distilled water.

To the thus-prepared solution, there is added 10 parts by volume of an aqueous solution containing 0.28 part of phosphoric acid, and then 10 parts by volume of an aqueous solution containing 1.98 parts of $AgNO_3$ is stirred thereinto.

To the thus-obtained solution, there is added 145 parts of Carborundum (particle size 3.8 to 4.3 millimeters in diameter), and the water is slowly removed by evaporation, whereby the solutes are supported on the Carborundum.

Then, after the manner set forth in Example 1, the above-treated Carborundum is heated at 400° C. for 8 hours to produce 155 parts of desired catalyst, wherein:

|  | Mol Part |
|---|---|
| $V_2O_5$ | 1.0 |
| $MoO_3$ | 0.386 |
| $P_2O_5$ | 0.014 |
| $Na_2O$ | 0.025 |
| $Ag_2O$ | 0.042 | are supported on the Carborundum, the total quantity of active ingredients amounting to about 22% (w./v.) relative to the carrier.

In manner similar to that set forth in Example 1, maleic anhydride is produced from benzene under various conditions (cf. Table 2), and the results are shown in the said table:

TABLE 2

|  | Condition | | | Result |
|---|---|---|---|---|
| No. | Space velocity (hr.$^{-1}$) | Concentration of benzene in mixed gas (mol percent) | Reaction temperature [1] | Maleic acid yield [2] (wt. percent) |
| 1 | 4,000 | 0.95 | 438 | 114 |
| 2 | 3,000 | 0.95 | 432 | 117.5 |

[1] Average temperature of catalyst.
[2] Relative to the weight of benzene fed.

EXAMPLE 3

After the manner set forth in Example 2, a catalyst is prepared, using the following substances:

| Distilled acid | parts by volume | 360 |
|---|---|---|
| Oxalic acid | parts | 78 |
| NaCl | do | 4.74 |
| $NH_4VO_3$ | do | 93 |
| $(NH_4)_6MoO_{27} \cdot 4H_2O$ | do | 27 |
| $H_3PO_4$ | do | 1.44 |
| $AgNO_3$ | do | 2.4 |
| Carborundum | do | 390 |

Thus 465 parts of the catalyst is obtained, wherein:

| | Mol part |
|---|---|
| $V_2O_5$ | 1.0 |
| $MoO_3$ | 0.386 |
| $P_2O_5$ | 0.014 |
| $Na_2O$ | 0.10 |
| $Ag_2O$ | 0.021 |
| $B_2O_3$ | 0.017 | are supported on Carborundum, the total amount of the active ingredients amounting to about 22% (w.v.) relative to the carrier. By the use of the catalyst, maleic acid is produced from benzene after the maner set forth in Example 1, and the following results are obtained:

TABLE 3

| | Condition | | | Result |
|---|---|---|---|---|
| No. | Space velocity (hr.⁻¹) | Concentration of benzene in mixed gas (mol percent) | Reaction temperature [1] | Maleic acid yield [2] (wt. percent) |
| 1 | 4,000 | 0.95 | 393 | 112 |
| 2 | 3,000 | 0.95 | 395 | 114 |

[1] Average temperature of catalyst.
[2] Relative to benzene fed.

It is clear from the foregoing that catalyst according to this invention is also effective, even at rather low reaction temperatures.

EXAMPLE 4

The same procedure is in Example 1 is carried out, except that ortho-xylene is used as the starting material in place of benezene, whereby the following results are contained:

TABLE 4

| | Condition | | | Result | |
|---|---|---|---|---|---|
| | | | | Yield relative to o-xylene fed (wt. percent) | |
| No. | Space velocity (hr.⁻¹) | Concentration of o-xylene in mixed gas (mol percent) | Reaction temperature (° C.) | Phthalic acid | Maleic acid |
| 1 | 5,000 | 0.60 | 450 | 119.1 | 9.5 |

What is claimed is:
1. A catalyst composition for the production of dicarboxlyic acid anhydride by oxidation of an organic compound, which composition consists of 1 mol part of $V_2O_5$, about 0.2 to about 0.7 mol part of $MoO_3$, about 0.01 to about 0.1 mol part of $P_2O_5$, about 0.01 to about 0.05 mol part of $Ag_2O$ and about 0.01 to about 0.3 mol part of $Na_2O$, all being supported on a carrier.

2. A catalyst composition for the production of dicarboxylic acid anhydride by oxidation of an organic compound, which composition consists of 1 mol part of $V_2O_5$, about 0.2 to about 0.7 mol part of $MoO_3$, about 0.01 to about 0.1 mol part of $P_2O_5$, about 0.01 to about 0.05 mol part of $Ag_2O$, about 0.01 to about 0.3 mol part of $Na_2O$ and about 0.01 to about 0.03 mol part of $B_2O_3$, all being supported on a carrier.

3. A catalyst composition for the production of dicarboxylic acid anhydrie by oxidation of an organic compound, which composition consists of 1 mol part of $V_2O_5$, about 0.2 to about 0.7 mol part of $MoO_3$, about 0.01 to about 0.1 mol part of $P_2O_5$, about 0.02 to about 0.04 mol part of $Ag_2O$ and about 0.025 to about 0.1 mol part of $Na_2O$, all being supported on a carrier.

4. A catalyst composition for the production of dicarboxylic acid anhydride by oxidation of an organic compound, which composition consists of 1 mol part of $V_2O_5$, about 0.2 to about 0.7 mol part of $MoO_3$, about 0.01 to about 0.1 mol part of $P_2O_5$, about 0.02 to about 0.04 mol part of $Ag_2O$, about 0.025 to about 0.1 mol part of $Na_2O$ and about 0.01 to about 0.02 mol part of $B_2O_3$, all being supported on a carrier.

5. A catalyst composition according to claim 1, wherein the carrier is a silicon carbide.

6. In a process for the production of maleic anhydride by oxidation of benzene, toluene or o-xylene in the presence of an oxidation catalyst under heating, the improvement wherein the oxidation catalyst consists of 1 mol part of $V_2O_5$, about 0.2 to about 0.7 mol part of $MoO_3$, about 0.01 to about 0.1 mol part of $P_2O_5$, about 0.01 to about 0.05 mol part of $Ag_2O$ and about 0.01 to about 0.3 mol part of $Na_2O$, all being supported on a carrier.

References Cited

UNITED STATES PATENTS

| 2,625,519 | 1/1953 | Hartig | 252—437 XR |
| 2,777,860 | 1/1857 | Egbert et al. | 260—346.8 |
| 3,086,026 | 4/1963 | Wiebusch | 252—437 XR |
| 3,211,671 | 10/1965 | Egbert | 252—437 |
| 3,277,017 | 10/1966 | Stefaniak | 252—437 |

PATRICK P. GARVIN, Primary Examiner

U.S. Cl. X.R.

252—432, 437, 435; 260—346.4